Oct. 11, 1960     D. D. SIBLEY     2,956,170

DIFFRACTION-TYPE LIGHT INTERRUPTER

Filed Sept. 1, 1953

INVENTOR:
David D. Sibley
By Herbert E. Metcalf
His Patent Attorney

United States Patent Office 2,956,170
Patented Oct. 11, 1960

2,956,170

DIFFRACTION-TYPE LIGHT INTERRUPTER

David D. Sibley, Los Angeles, Calif., assignor to Northrop Corporation, Hawthorne, Calif., a corporation of California Filed Sept. 1, 1953, Ser. No. 377,762

4 Claims. (Cl. 250—203)

My invention relates to light interrupting devices and more particularly to a transmission type chopper having alternate clear and diffraction grating segments.

At present, transmission type light choppers employ alternate clear and opaque segments which have the disadvantage of being unable to discriminate between coherent and non-coherent light sources in the sky. Using a diffraction type chopper makes it possible to so discriminate and thus to greatly improve navigational accuracy especially during the hours of daylight.

The usual procedure where a light interrupter or chopper is utilized for navigational purposes is to channel the light source through an arrangement of optical lenses such as a telescope, and then to transmit the channeled light through the chopper to a photoelectric cell in axial alignment with the chopper. The photoelectric cell is sensitive to both coherent and non-coherent light which results in navigational inaccuracy when a non-coherent light source by virtue of a sudden increase in light intensity causes a signal to be sent from the cell to the tracking motors actuated by the cell. To eliminate this difficulty according to this invention a diffraction grating type light interrupter is used in tracking the stellar system.

It is to be remembered that a characteristic of diffraction gratings is to diffract coherent light waves from their path of travel and conversely to have no average effect in the center of a sky-image, in so far as diffraction is concerned, upon waves emanating from relatively large non-coherent light sources. Thus a light interrupter disk comprising alternate clear and diffraction grating segments may be made to cause a signal to be sent to the photoelectric cell when waves from a coherent light source are passed through the rotating disk, and conversely, precluded from transmitting any signal when the light source being tracked is a broad non-coherent one.

It is, therefore, a general object of my invention to provide a light interrupting device which will discriminate between coherent and non-coherent light sources.

A more specific object of my invention is to provide a chopper disk which will cause coherent light waves to be diffracted and non-coherent light waves unaffected in their respective paths of travel.

Another object of my invention is to provide a light interrupting device which will greatly improve navigational accuracy.

Other objects and uses of my invention will manifest themselves from the subsequent description and drawings forming a part of the specification wherein.

Figure 1:
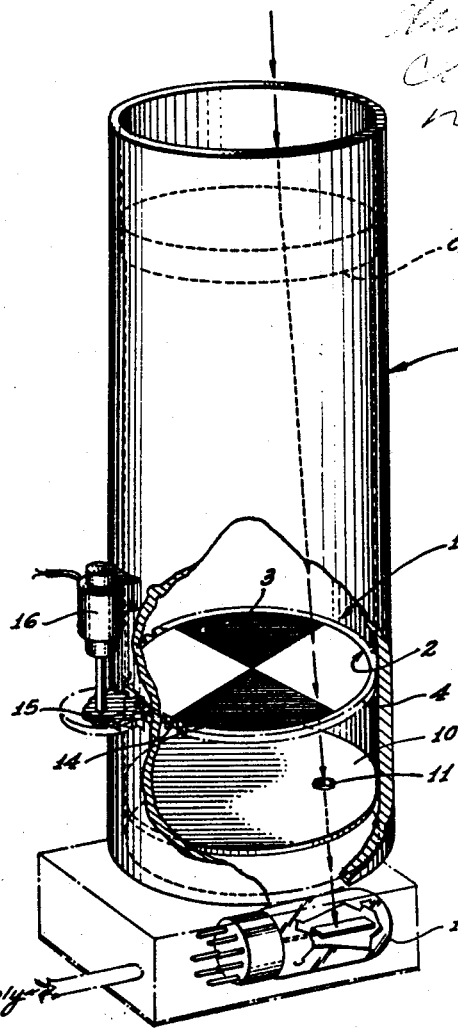
Figure 1 is a perspective view of a portion of a tracking system in which the invention is utilized, said portion being partially removed to show interior arrangement of component parts.
Figure 2:
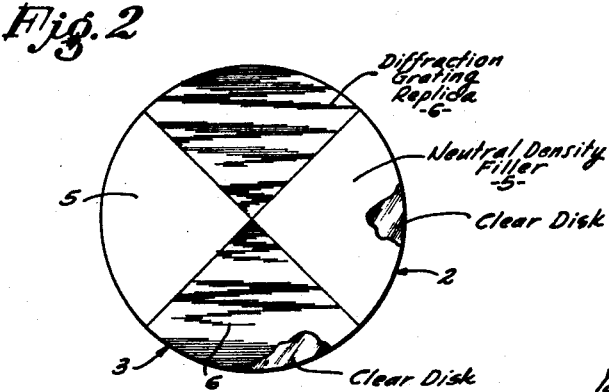
Figure 2 is a plan view of the scanner invention partially broken away to show the fact that a neutral density filter is placed upon the light transmitting segments.

Referring to the drawings, a light interrupter or rotary chopper disk 1 is made up of alternate light transmitting and diffraction grating segments 2 and 3. A neutral density filter 5 is placed over the transmitting segments 2 to reduce the intensity of light which is transmitted through said segments 2. The diffraction grating segments 3 are made up by pasting diffraction emulsion grating replicas 6 onto the disk 1. The absorption qualities of the transmitting segments 2 and diffraction grating segments 3 are matched so that light waves falling upon either type segment will be absorbed to the same degree and no more. A mask 10 having an aperture 11 therein is placed between the disk 1 and a photosensitive device 12, which may be a photoelectric cell, the latter being effective to transmit electrical impulses under the stimulus of a change in light intensity from the respective light waves sensed by the scanner disk 1. An arrangement of optical lenses, which may be a telescope 13 is used for directing waves from the light sources within the sky to the chopper disk 1 and then to the photosensitive device 12. Electrical impulses from the photosensitive device 12 are actuators for a servo ssytem (not shown) which is used to maintain the desired direction of the moving plane or ship. The disk 4 is provided with gear teeth 14 and caused to rotate by a mating gear 15 actuated by a motor 16.

The light interrupter device 1 is enabled to discriminate between coherent and non-coherent light waves in the following manner. Light from the sky is channeled through the telescope 13 and directed toward the rotating disk 1. Where the light so directed is composed only of waves emanating from skylight and broad non-coherent light sources, the light will be transmitted through the disk 1 constant in intensity. However, if a star or other coherent light source appears in the telescopic line of sight, a non-constant light intensity will be sent to the photosensitive device 12. This non-constancy is caused by virtue of the fact that when the clear segment 2 is aligned with the telescopic line of sight, the full intensity of the light, i.e. the effect of the skylight plus the coherent light source, is transmitted through the aperture 11 in the mask 10 to the photosensitive device 12, while alignment of the diffraction grating segment 3 with the telescopic line of sight causes the coherent light waves to be diffracted away from the aperture 11. Hence the photosensitive device 12 will, on this latter condition, record a light intensity of a lesser amount than that which passed through the clear segment 2 since the magnitude of light intensity resulting from the coherent light source is never registered on the cell 12. Due to the fact that changes in light intensity give rise to non-constant intensity at the photosensitive device 12, an effective means for discriminating between coherent and non-coherent light sources has been provided since no change in light intensity is recorded when non-coherent light waves pass through both the clear and the diffraction grating segments 2 and 3. Thus where a broad non-coherent light source comes within the telescopic line of sight, the chopper disk 1 and the photosensitive device 12 will prevent the tracking system from being actuated by an alternating voltage. This in turn precludes false signals and inaccurate navigation caused by tracking on ostensible coherent light sources.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a tracking system, a light interrupter comprising a disk having transmitting segments and diffraction grating segments; means for channeling a light source onto said disk; a mask having an aperture therein, said mask positioned to receive light transmitted from said disk; and photosensitive means positioned to receive light passed through said disk aperture.

2. In a tracking system, a light interrupter effective to discriminate between coherent and non-coherent light sources comprising a disk having transmitting segments and diffraction grating segments; means for channeling a light source onto said disk; a mask having an aperture therein, said mask positioned beneath said disk and the aperture in said mask being laterally disposed from the axis of said disk, said aperture effective to receive light transmitted through said disk; and photosensitive means for receiving the light transmitted through said aperture.

3. Apparatus in accordance with claim 2 further characterized by a telescope for channeling the waves emanating from a light source in the stellar system.

4. Apparatus in accordance with claim 3 further characterized by the fact that said photosensitive means is a photoelectric cell.

References Cited in the file of this patent

UNITED STATES PATENTS

| | | |
|---|---|---|
| 818,966 | Ives | Apr. 24, 1906 |
| 1,299,956 | Jurgensen | Apr. 8, 1919 |
| 2,463,280 | Kaehni et al. | Mar. 1, 1949 |

FOREIGN PATENTS

| | | |
|---|---|---|
| 33,746 | Netherlands | Oct. 15, 1934 |